No. 687,926. Patented Dec. 3, 1901.
J. P. SMITHERS.
TRACTION WHEEL.
(Application filed Aug. 27, 1898. Renewed May 6, 1901.)
(No Model.) 2 Sheets—Sheet 1.
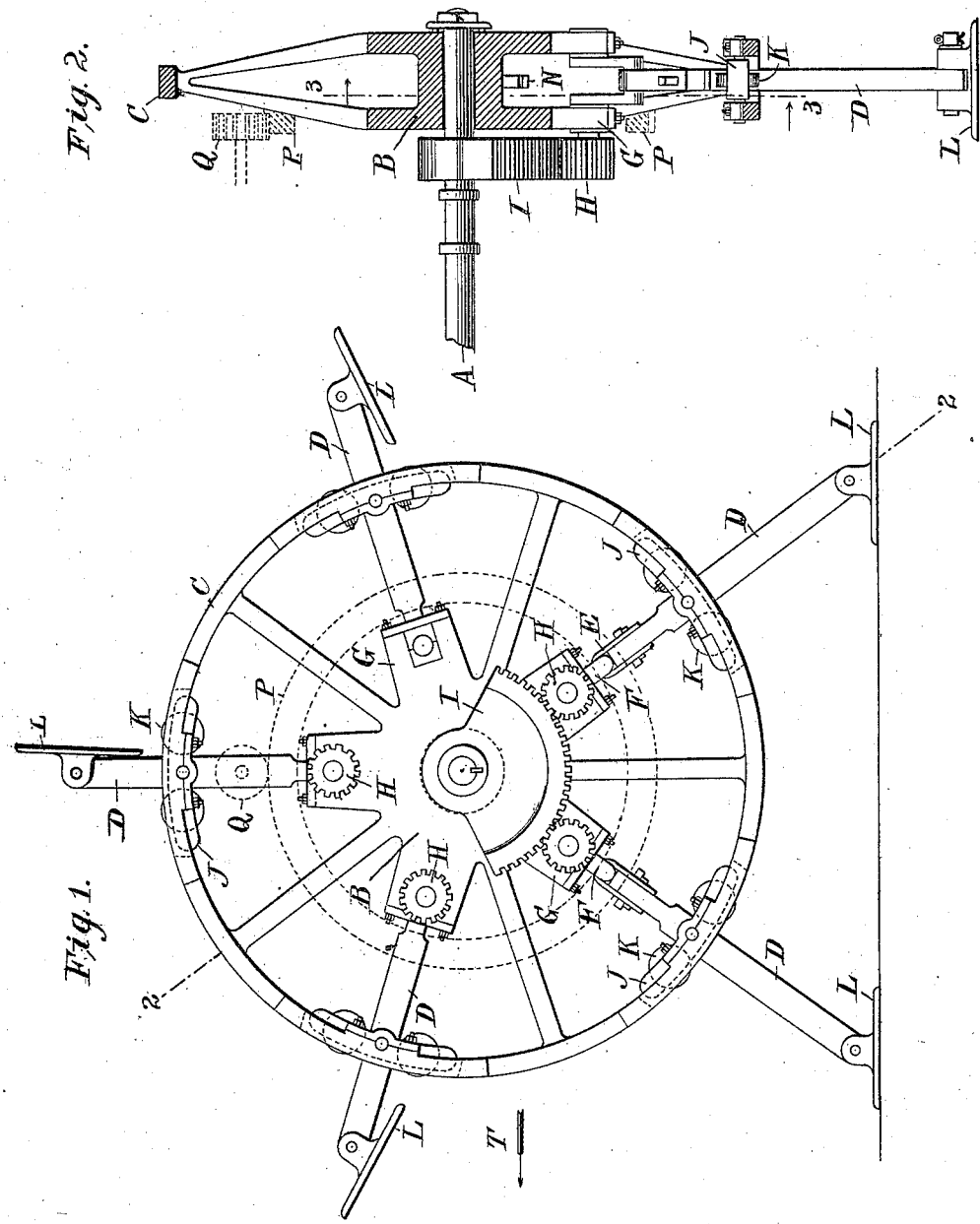
Witnesses:
C. L. Belcher
Wm. H. Caspel.
Inventor
Joseph P. Smithers
By
Attorney.

No. 687,926. Patented Dec. 3, 1901.
J. P. SMITHERS.
TRACTION WHEEL.
(Application filed Aug. 27, 1898. Renewed May 6, 1901.)
(No Model.) 2 Sheets—Sheet 2.
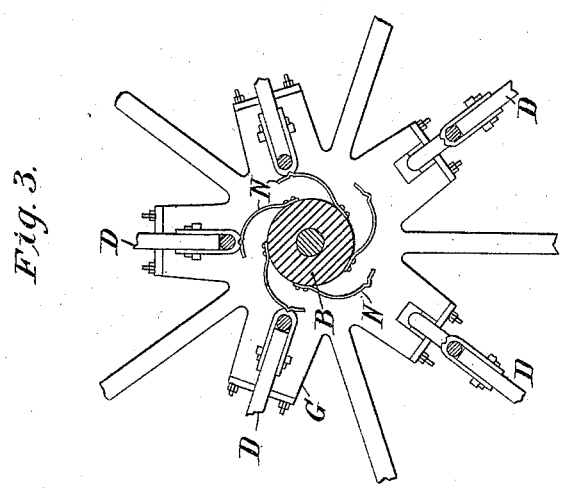
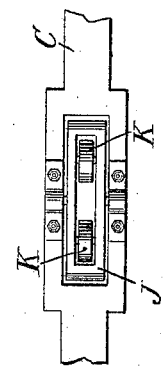
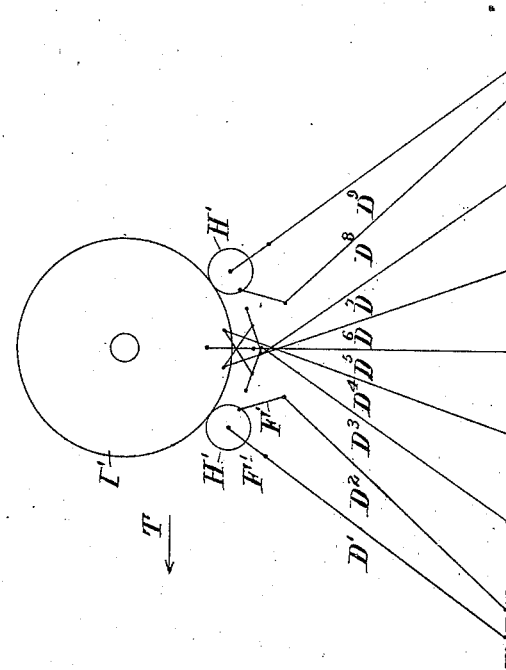
Witnesses:
C. L. Belcher
Wm. H. Capel
Inventor
Joseph P. Smithers
By
J. C. Townsend
Attorney

UNITED STATES PATENT OFFICE.

JOSEPH P. SMITHERS, OF BROOKLYN, NEW YORK.

TRACTION-WHEEL.

SPECIFICATION forming part of Letters Patent No. 687,926, dated December 3, 1901.

Application filed August 27, 1898. Renewed May 6, 1901. Serial No. 59,030. (No model.)

*To all whom it may concern:*

Be it known that I, JOSEPH P. SMITHERS, a subject of the Queen of Great Britain, and a resident of Brooklyn, in the county of Kings and State of New York, have invented certain new and useful Improvements in Traction-Wheels, of which the following is a specification.

This invention relates to traction-wheels, and especially to such a wheel designed for use on vehicles employed in carrying heavy loads or in carrying loads over heavy roads.

It also relates particularly to that class of traction-wheels provided with movable feet or spurs.

The main object of the invention is to construct a wheel of this class in a manner such that the axle or the center of the wheel shall retain a fixed level with reference to the road-bed, thereby avoiding the jolting or jouncing to which most wheels of this class subject the load carried thereby.

A further object of the invention is to construct a wheel of this class in a simple, strong, and durable manner and one that can be adapted to driving the vehicle, if desired, as well as simply to act as a trundle-wheel on vehicles drawn by draft-animals or other motive power.

With these objects in view the invention consists in the construction, combination, and arrangement of parts, as hereinafter fully described and claimed.

In the accompanying drawings, which form a part of this specification, Figure 1 represents the improved traction-wheel in elevation. Fig. 2 represents a diametrical section through the wheel, taken on the line 2 2 of Fig. 1. Fig. 3 is a vertical section through the middle of the wheel, taken in the plane indicated by the line 3 3, Fig. 2. Fig. 4 is a detail view. Fig. 5 is a diagram illustrating the operation of the wheel.

A indicates the axle of the wheel, B the hub of the wheel, and C the rim thereof.

D indicates the legs through which traction is effected. These reciprocate through suitable guides in the rim of the wheel and are connected at their inner ends in any suitable manner, as by the straps E, with cranks F, that are journaled in suitable bearings in projections G, extending radially from the hub B. To each crank is keyed a pinion, as H. These pinions engage with a mutilated gear or sector I, which is keyed upon the axle A.

The guides for the legs D may be of any suitable construction; but they are preferably formed by pivoting in a rim C a cradle, as J, for each leg. In this cradle are journaled antifriction-wheels K, which bear against the edges of the leg. By mounting these guide-wheels in a cradle they will be enabled to follow the movements of the legs as they are reciprocated by the cranks F.

At the outer extremities of the legs D are suitably secured, as by the hinge-joint shown, the plates or feet L. These feet may be of any desired form and of any desired size, depending upon the weight of the vehicle and load which they are expected to support.

In place of the mutilated gear I a complete gear might be used; but this would cause constant reciprocation of the legs even when out of engagement with the ground. It is preferable to retain the legs in a position of rest when out of engagement with the ground, and for that purpose the gear is mutilated, as shown, so that as soon as a leg leaves the ground it will be drawn to its innermost position and there engaged by a suitable catch—such, for instance, as a spring-dog N, mounted upon the hub B, as indicated in Figs. 2 and 3. This engagement with the dog N takes place at the instant the pinion H leaves the mutilated gear I. The hold of the dog upon the leg is such only as will retain it in the position of rest until the pinion H again engages the sector I, when the dog will readily loose its hold upon the leg and allow it to reciprocate while touching the ground.

The wheel, as shown in full lines, is intended for use upon a vehicle drawn by draft-animals or other suitable motive power, though it is obvious that it may be readily used as a driving-wheel. Its conversion into a driving-wheel is effected by attaching to the spokes of the wheel a toothed rim, such as indicated in dotted lines at P. With this toothed rim a pinion, as Q, may engage, which pinion shall be driven by any suitable motive power located upon the vehicle.

As stated at the outset, the main object of this invention is to construct a traction-wheel of the sort described which will enable the vehicle to be moved over the ground with its axle or axles at a uniform distance from the surface of the road-bed—that is, the wheel shall so operate that it will not cause an up-and-down motion to the axle of the vehicle as the wheel steps along. That the construction just described accomplishes this end is illustrated in Fig. 5. In said figure the large circle I' represents the gear I, while the small circles H' represent the pinions H, and the lines D' D² D³, &c., indicate the successive positions of one of the legs D, the short lines F' indicating the positions of the crank F. In this diagram the leg D takes the ground in the position indicated at D', the wheel moving in the direction indicated by the dart T. The next position of the leg D is indicated by the line D² and its successive positions by the lines D³ to D⁹, the last position being the same as the first and being the position at which the leg leaves the ground. It will be seen that the relative lengths of the crank F and legs D are such and the ratio of the pinion H and the gear I are such that as the crank rotates the leg with respect to the center of the axle is, in effect, shortened, so as not to raise the axle at all as it is drawn forward and passes the point of engagement of the leg with the ground.

The positive connection of the traction-legs with the means for reciprocating them is of considerable importance in the construction of a strong traction-wheel as well as in the operation of said wheel. It insures positive and unfailing action of the legs and an ease in the operation thereof which cannot be attained in the old forms of traction-wheels of this class.

Various changes in the formation of parts and the construction of the whole may be made without departing from the spirit of this invention.

What I claim as my invention is—

1. A rotary traction-wheel provided with reciprocating legs in combination with a gear fixed to the vehicle, and a crank connected to each leg and intermittently turned by said gear, substantially as set forth.

2. A rotary traction-wheel provided with reciprocating legs in combination with a mutilated gear fixed to the axle, a crank for each leg, a gear attached to each crank, and means for holding the legs in position of rest when out of engagement with the gear, substantially as set forth.

3. A traction-wheel consisting of a rim provided with guides therein, legs passing through said guides, cranks journaled at the hub of the wheel and one connected to each leg, a gear on each crank, and a gear on the axle of the wheel with which each crank-gear meshes, substantially as and for the purpose set forth.

4. The combination with the rim of the wheel provided with openings therein, of cradles in said openings pivoted on trunnions at the sides thereof, guide-rolls journaled in the ends of the cradles, the reciprocating legs passing between said guide-rolls, and means for reciprocating said legs, as and for the purpose set forth.

Signed at New York, in the county of New York and State of New York, this 25th day of August, A. D. 1898.

JOSEPH P. SMITHERS.

Witnesses:
WM. H. CAPEL,
DELBERT H. DECKER.